United States Patent [19]
George et al.

[11] Patent Number: 5,230,289
[45] Date of Patent: Jul. 27, 1993

[54] KEYBOARD SUPPORT ASSEMBLY

[75] Inventors: William R. George, San Francisco; Wade D. McNary, Menlo Park; Chris Tacklind; Rickson Sun, both of Palo Alto, all of Calif.

[73] Assignee: Steelcase Inc., Grand Rapids, Mich.

[21] Appl. No.: 708,488

[22] Filed: May 31, 1991

[51] Int. Cl.⁵ ............................................... A47F 5/12
[52] U.S. Cl. .......................................... 108/2; 108/10; 108/140; 108/145
[58] Field of Search ............... 108/139, 140, 141, 142, 108/145, 146, 2, 5, 6, 10

[56] References Cited

U.S. PATENT DOCUMENTS

| | | |
|---|---|---|
| D. 280,478 | 9/1985 | Stephens . |
| D. 286,352 | 10/1986 | Huculak . |
| 719,625 | 2/1903 | Throm . |
| 3,778,125 | 12/1973 | Gutmann, Jr. et al. . |
| 3,830,352 | 8/1974 | Kolpek . |
| 4,183,489 | 1/1980 | Copher et al. . |
| 4,248,161 | 2/1981 | Addir et al. ............... 108/6 |
| 4,379,429 | 4/1983 | Gubbe et al. . |
| 4,431,153 | 2/1984 | Kritske ...................... 108/6 |
| 4,496,200 | 1/1985 | Hagstrom et al. . |
| 4,545,554 | 10/1985 | Latino et al. . |
| 4,546,708 | 10/1985 | Wilburth . |
| 4,562,987 | 1/1986 | Leeds et al. . |
| 4,616,798 | 10/1986 | Smeenge et al. . |
| 4,625,657 | 12/1986 | Little et al. . |
| 4,637,666 | 1/1987 | Worrell et al. . |
| 4,644,875 | 2/1987 | Watt . |
| 4,653,818 | 3/1987 | DeBruyn . |
| 4,717,112 | 1/1988 | Pirkle . |
| 4,733,618 | 3/1988 | Sarro et al. . |
| 4,736,689 | 4/1988 | Stanko . |
| 4,776,284 | 10/1988 | McIntosh . |
| 4,843,978 | 7/1989 | Schmidt et al. . |
| 4,844,388 | 7/1989 | Kuba et al. . |
| 4,852,500 | 8/1989 | Ryburg et al. . |
| 4,863,124 | 9/1989 | Ball et al. . |
| 4,880,270 | 11/1989 | Cooper . |
| 4,901,972 | 2/1990 | Judd et al. . |
| 4,923,259 | 5/1990 | Bartok . |
| 4,931,978 | 6/1990 | Drake et al. . |
| 4,938,441 | 7/1990 | Hannah et al. . |
| 5,037,054 | 8/1991 | McConnell . |
| 5,037,163 | 8/1991 | Hatcher . |
| 5,040,760 | 8/1991 | Singer . |
| 5,041,770 | 8/1991 | Seiler et al. . |

FOREIGN PATENT DOCUMENTS 3622967  1/1988  Fed. Rep. of Germany .......... 108/6

Primary Examiner—Kenneth J. Dorner
Assistant Examiner—Gerald A. Anderson
Attorney, Agent, or Firm—Price, Heneveld, Cooper, DeWitt & Litton

[57] ABSTRACT

An articulated, manually adjustable keyboard support apparatus including an elongated, transverse support member, first and second arms pivoted to the support member and a keyboard platform or tray subassembly joined to lower ends of the arms. The transverse support member is joined to a beam by a first vertical hinge. The beam is pivoted to a slide by a second vertical hinge. The slide is received in a track. Springs counterbalance the weight of a keyboard positioned on the platform subassembly. A palm rest subassembly is adjustably mounted on the platform subassembly.

43 Claims, 6 Drawing Sheets

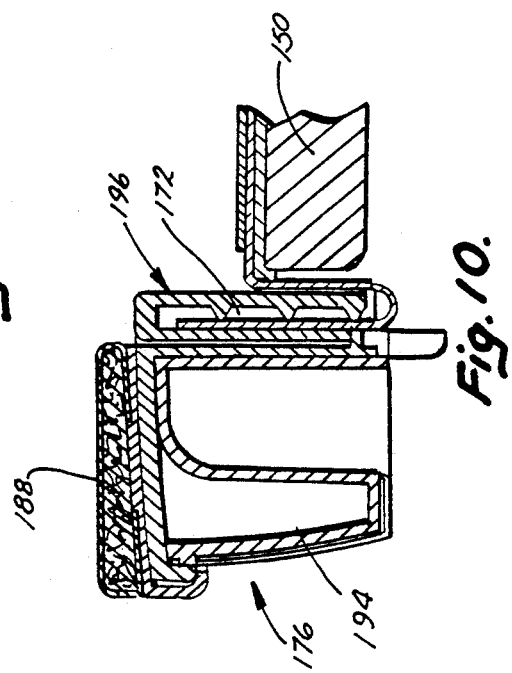
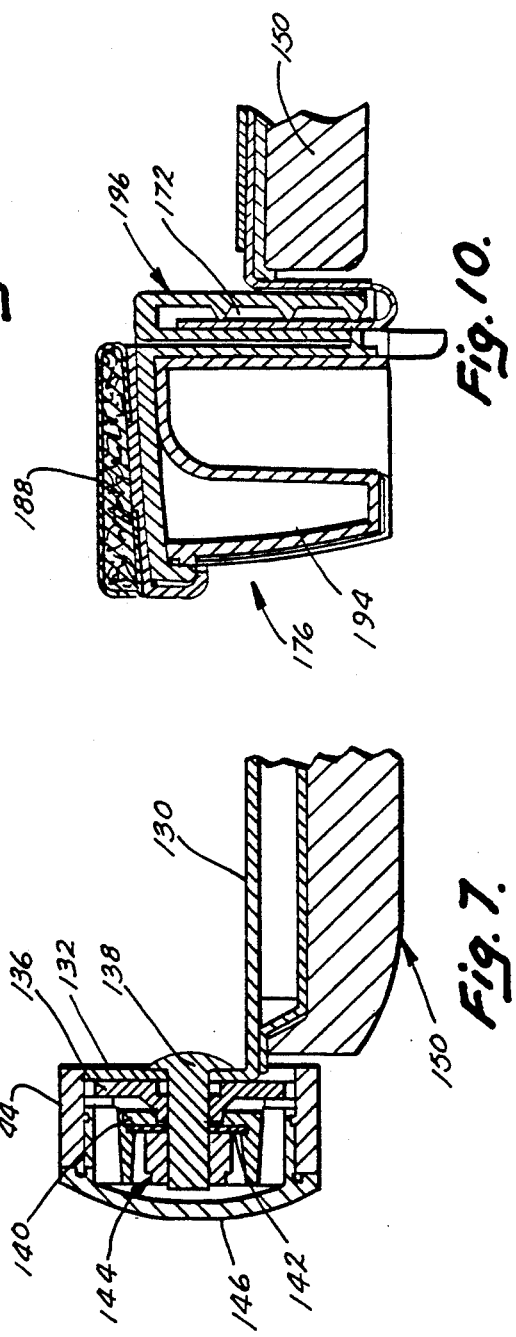
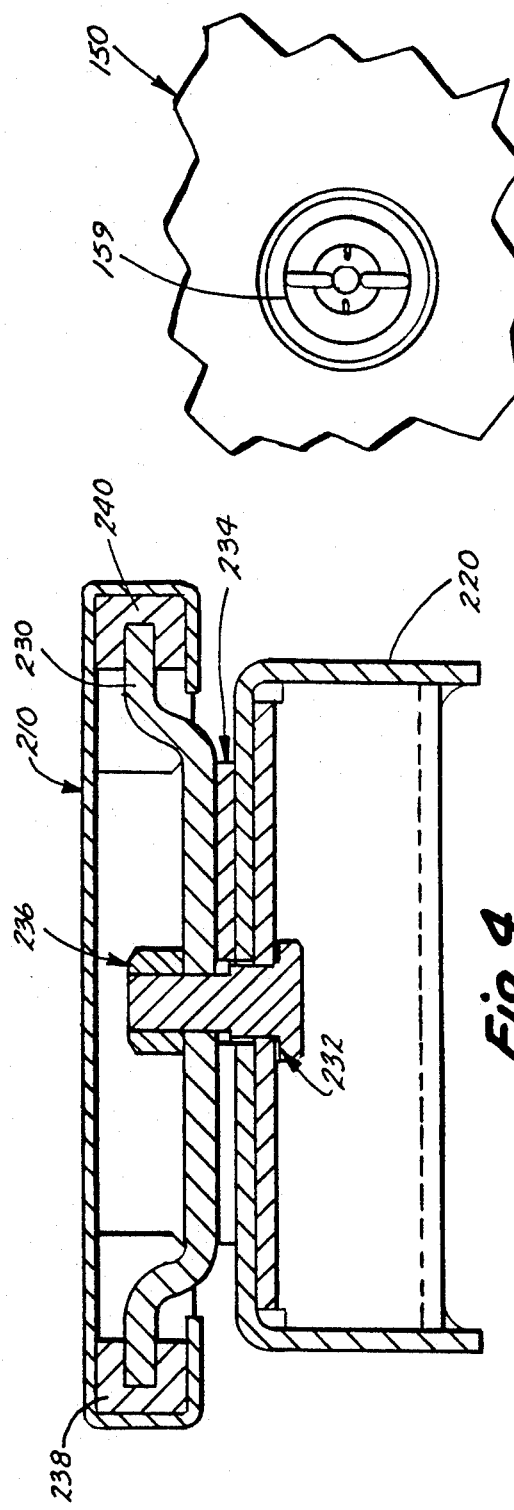

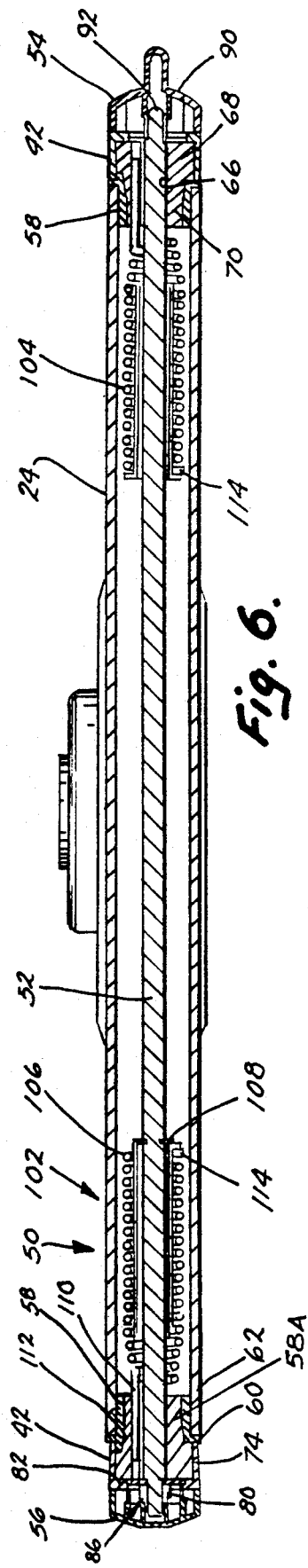
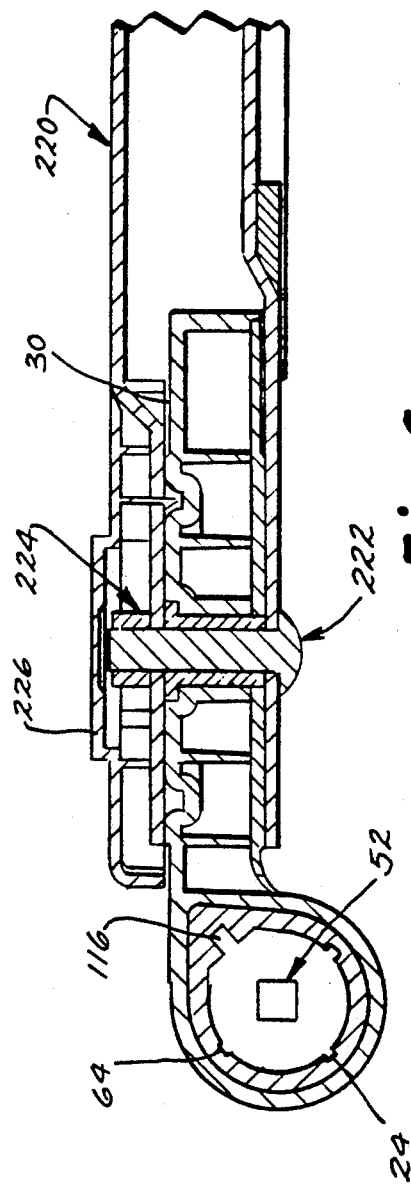

KEYBOARD SUPPORT ASSEMBLY

BACKGROUND OF THE INVENTION

The present invention relates to articulated keyboard supports for adjustably positioning a computer keyboard with respect to the user and a worksurface.

A typical computer work station includes a horizontal worksurface adapted to support a terminal or monitor and a keyboard. Various devices have been proposed for accommodating a computer keyboard at a work station. Some devices move the keyboard between a stored position and an operating position. Other devices also adjustably position the keyboard with respect to the monitor, the worksurface and/or the user. Adjustability increases the ease of use of the equipment and reduces operator fatigue. Examples of prior devices may be found in U.S. Pat. No. 4,776,284 entitled RETRACTABLE WORK STATION and issued on Oct. 11, 1988 to McIntosh; U.S. Pat. No. 4,844,388 entitled SUPPORT ARM FOR COMPUTER KEYBOARD and issued on Jul. 4, 1989 to Kuba et al; U.S. Pat. No. 4,923,259 entitled ADJUSTABLE KEYBOARD DRAWER ASSEMBLY and issued on May 8, 1990 to Bartok and U.S. Pat. No. 4,938,441 entitled SLIDE PLATE ADJUSTMENT MECHANISM and issued on Jul. 3, 1990 to Hannah et al.

Problems have been experienced with prior keyboard supports. These problems have included limited range of adjustability, interference, complexity and difficulties in manufacture. Many of the devices extend downwardly from the undersurface of the work station and interfere with the operator. The operator's knees may, for example, knock into the stored support.

A need exists for a keyboard support which provides a wide range of adjustability, which minimizes or eliminates interference problems, which is of reduced complexity and which increases ease of manufacture and assembly when compared to prior devices.

SUMMARY OF THE INVENTION

In accordance with the present invention, a manually adjustable keyboard support is provided whereby the aforementioned needs are fulfilled. The support has an extended range of adjustment to accommodate a wide variety of users and different use situations. The support stores underneath a worksurface so as to minimize or eliminate any interference with the user. Essentially, the present invention includes an arm subassembly and a platform subassembly. The arm subassembly includes a transverse member and a pair of arms pivoted thereto. The keyboard platform subassembly is pivoted or adjustably secured to the arm subassembly. Provision is made for counterbalancing the weight of the keyboard and locking the arm subassembly and, hence, the platform subassembly in various ergonomically desirable positions.

In narrower aspects of the invention, the transverse support member is joined to a carriage subassembly by a first vertical hinge means. The carriage subassembly includes an elongated beam and a slide. The slide is adjustably positionable within a track. The slide is joined to the beam by a second vertical hinge. The track is attachable to the undersurface of a work station.

In further aspects of the invention, the keyboard platform is adjustable to accommodate different size computer keyboards. Further, an adjustable palm rest or wrist support subassembly may be included.

BRIEF DESCRIPTION OF THE DRAWINGS

FIG. 4 is a cross-sectional view taken generally along line IV—IV of FIG. 2;

FIG. 5 is a cross-sectional view taken generally along line V—V of FIG. 1;

FIG. 6 is a cross-sectional view taken generally along line VI—VI of FIG. 1;

FIG. 7 is a fragmentary, cross-sectional view taken generally along line VII—VII of FIG. 1;

FIG. 8 is a view taken generally along line VIII—VIII of FIG. 2;

FIG. 10 is a fragmentary, enlarged cross-sectional view taken along line X—X of FIG. 1;

DETAILED DESCRIPTION OF THE PREFERRED EMBODIMENT

Figure 1:
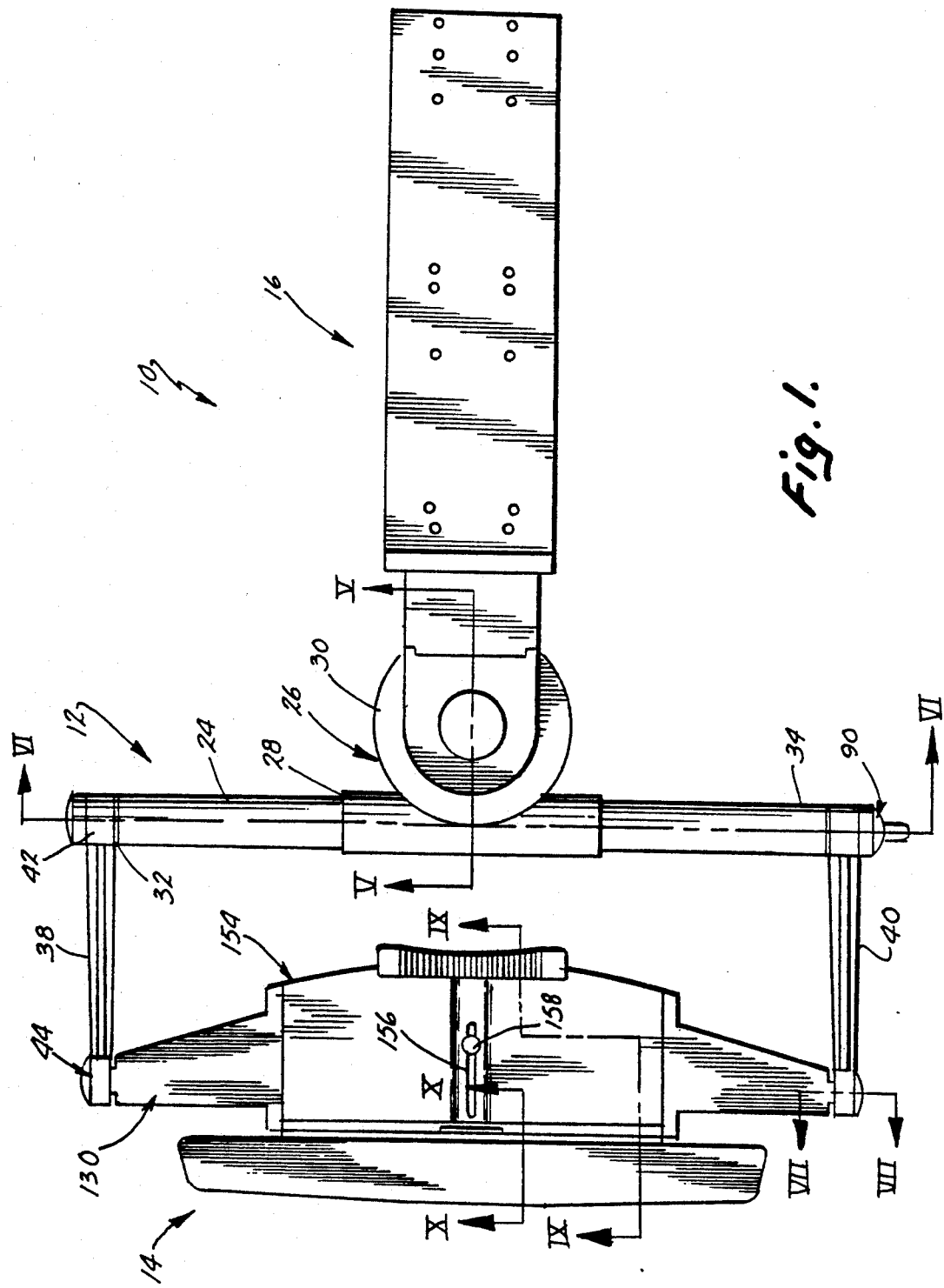
FIG. 1 is a top, plan view of a keyboard support apparatus in accordance with the present invention.
Figure 2:
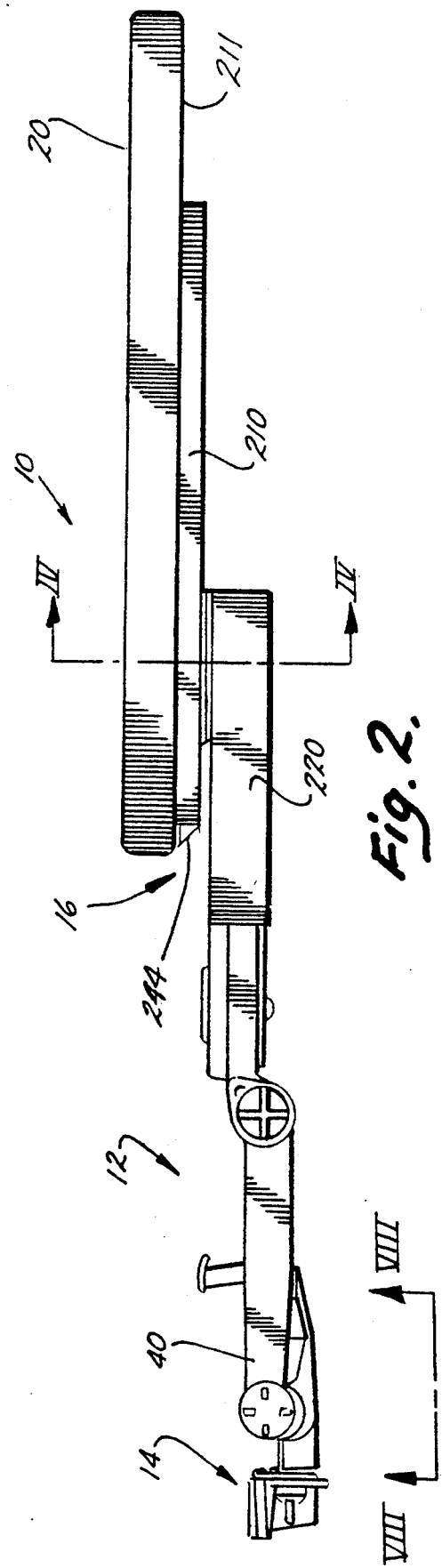
FIG. 2 is a side, elevational view thereof.

A keyboard support apparatus in accordance with the present invention is illustrated in FIGS. 1 and 2 and generally designated by the numeral 10. Device 10 includes an arm subassembly 12, a keyboard platform subassembly 14 and an attachment subassembly 16. As shown in FIG. 2, attachment subassembly 16 mounts the apparatus underneath a horizontal work support, worksurface, desk top or the like 20.

Figure 11:
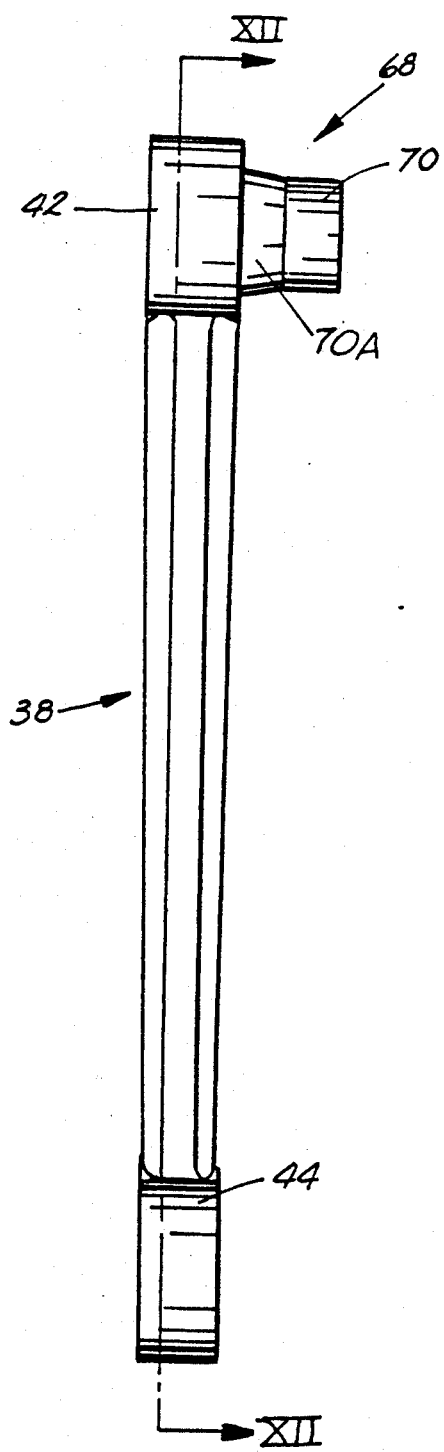
FIG. 11 is a top view of an arm included in the present invention.
Figure 12:
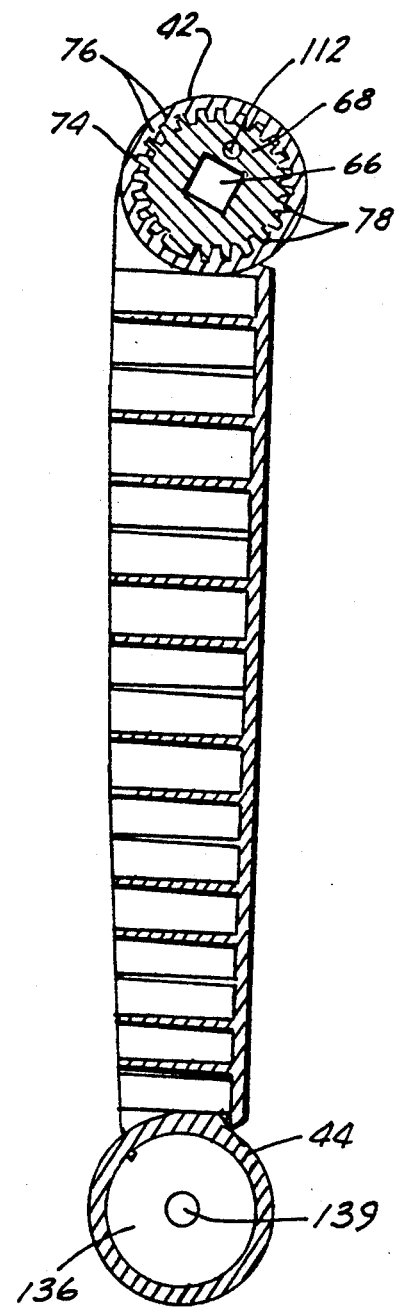
FIG. 12 is a cross-sectional view taken generally along line XII—XII of FIG. 11.

As seen in FIGS. 1, 2, 5 and 6, arm assembly 12 includes an elongated tube, housing or transverse support member 24. Transverse support member 24 is received within a knuckle or swivel subassembly 26. Swivel subassembly 26 includes a tubular support portion 28 joined to a generally circular swivel 30. Support arms 38, 40 are positioned at each end 32, 34 of transverse tubular member 24. Arms 38, 40 are handed, that is, they are mirror images of each other and are provided for left and right side use. FIGS. 11 and 12 illustrate left hand or left side arm 38. Each arm 38, 40 includes an upper, generally circular or hub-like portion 42 and a lower, hub-like portion 44.

Arms 38, 40 are pivotally or rotatably supported on transverse support member 24 by a pivot and counterbalance subassembly 50 (FIG. 6). Subassembly 50 includes an elongated axle or torque rod 52. It is presently preferred that rod 52 have a non-circular or rectangular cross section. Rod 52 extends through the interior of transverse housing 24 and terminates in threaded studs or ends 54, 56. In the alternative, rod 52 may have a circular cross section and have its ends cold headed to a non-circular shape. Bushings or inner clutch members 58 are disposed within the open ends of tube 24. Inner clutch members 58 include an inner surface 60 which consists of a conical surface and a cylindrical surface and an outer surface 62 configured to cooperate with and be received by radial slots 64 (FIG. 5) defined by tube 24. The cylindrical surfaces (58) on the inner clutch members function as bushings which are nonrotatably supported in the ends of the tube 24 while the conical surfaces (58a) function as braking surfaces.

Axle 52 extends through similarly configured bores or passages 66 formed within outer clutches or pivot defining members 68 (FIGS. 6, 11 and 12). Each member 68 includes a cylindrical portion 70 which rotates within bushing 58 and a conical portion 70a, which when in contact with 58a, functions as a brake. Upper portion 42 of each arm 38, 40 defines a socket 74. Socket 74 defines a plurality of teeth 76 around its inner circumference. The outer circumference of clutch portion 68 defines similarly configured teeth 78 which mate therewith (FIG. 12). Left arm 38 is slipped over clutch member 68 and held by a nut 80 threaded onto axle 52. The nut captures an inner web 82 defined by the hub portion against the end of axle 52 (FIG. 6). A cap 86 covers the left end of tube 24. A lock cap or knob 90 is threaded onto the right end of axle 52 (FIG. 6). Cap 90 includes an inner nut-like portion 92 which threads onto threaded end 56 of axle 52. When tightened, cap 90 forces braking surfaces 58a and 70a together, which locks arms 38, 40 in position.

A counterbalance mechanism in the form of a pair of coil springs 102, 104 biases the arms towards a raised position. Each spring 102, 104 is positioned around a sleeve 106 which in turn is positioned by a retaining ring 108. Each spring has an end 110 which is disposed within an aperture or bore 112 defined by each clutch 68. An opposite end portion 114 of each spring is disposed within a slot or groove 116 defined by tube 24 (FIG. 5). As a result, downward movement of arms 38, 40 with respect to the plane of the knuckle or swivel subassembly 26 causes springs 102, 104 to coil. The springs resiliently bias the arms to an operative or upright position. A preload may be placed on the arm subassembly by selective positioning of arms 38, 40 on clutch members 68. For example, the arms may initially be positioned so that they extend upwardly at a forty-five degree to ninety degree angle with respect to housing 24 with the springs uncoiled.

Platform support subassembly 14 includes an elongated bridge member 130. Bridge member 130 includes upturned ends 132 (FIG. 7). Upturned ends, tabs or ears 132 are used to attach the bridge subassembly to hub portions 44 of arms 38, 40. As seen in FIGS. 7 and 12, hub portion 44 includes an inner wall or web 136. A fastener 138 passes through an aperture formed in ear or tab 132 and an aperture 139 formed in wall 136. A Washer 140, a Belleville spring 142 and a lock nut 144 are positioned on fastener 138. An end cap 146 covers hub 44. Belleville spring 142 pulls tab 132 into engagement with wall 136. Fasteners 138 define a horizontal pivot axis. A frictional force is created which holds bridge subassembly 130 in a desired angled or tilted position. For ease of operation, a knob such as knob 92 may be threaded onto one of the fasteners 138. Tightening of the knob would increase the frictional force and set the tilt of the bridge member.

A (foamed urethane) knee pad 150 is secured to the undersurface of bridge subassembly 130. A rear platform member 152 and a front platform member 154 are positioned centrally on bridge 130. Platform member 154 defines a slot 156. A fastener 158 extends through the slot, bridge subassembly 130 and pad 150. A threaded platform knob 159 engages the fastener (FIG. 8). Front platform 154 may, therefore, be shifted with respect to platform 152 and locked to accommodate different size keyboards.

Figure 3:
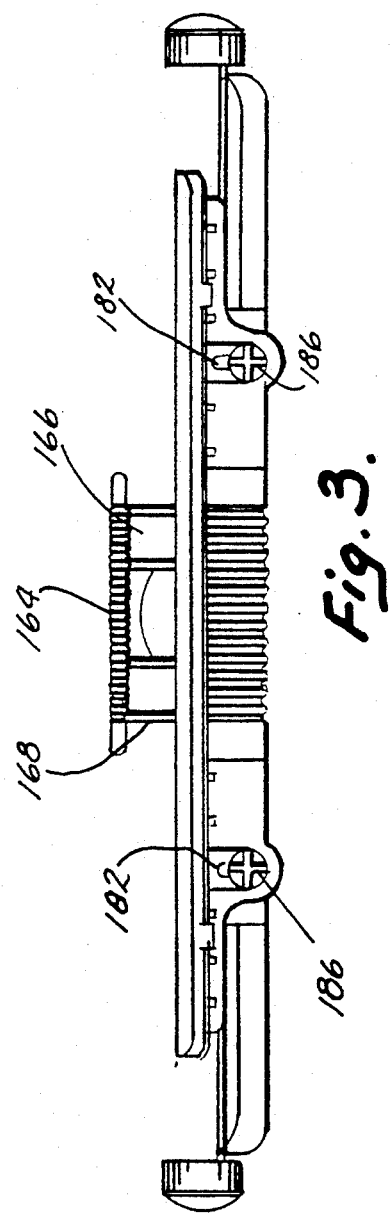
FIG. 3 is a front, elevational view of the keyboard platform subassembly incorporated in the present invention.

Platform portion 154 includes upwardly extending tabs 162. A handle 164 includes depending legs 166, 168 (FIGS. 3 and 9) which receive the upstanding tabs 162 in a snap-fit fashion.

Figure 9:
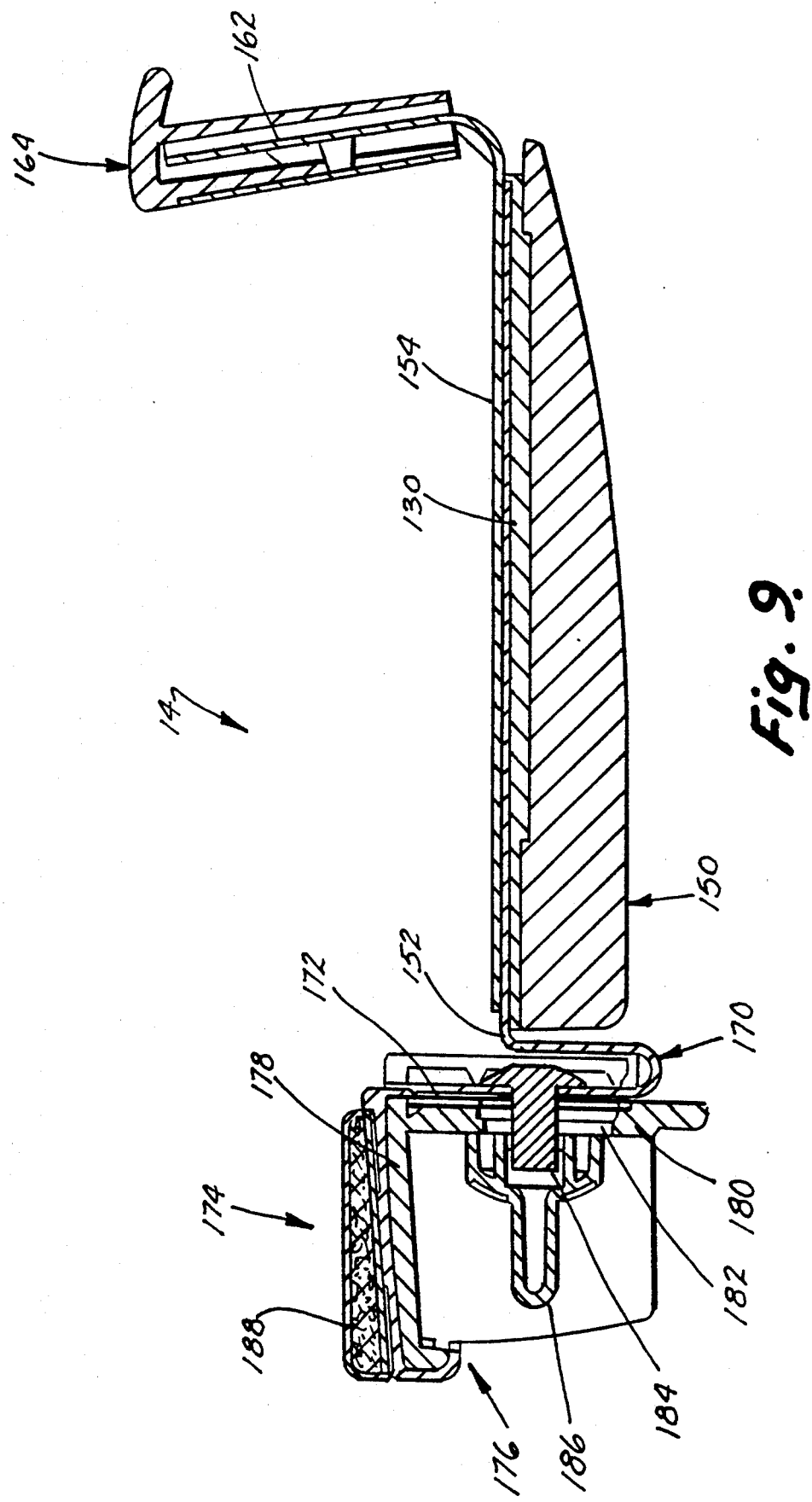
FIG. 9 is a cross-sectional view taken generally along line IX—IX of FIG. 1.

Platform portion 152 (FIG. 9) includes a generally U-shaped portion 170 having a upstanding leg 172. A palm rest pad or soft wrist support subassembly 174 is supported on upturned leg portion 172. Pad subassembly 174 includes an elongated pad support member 176. Member 176 is generally U-shaped in cross section and includes a generally horizontal upper flange portion 178 and a vertical portion 180. Portion 180 defines transversely spaced, vertically extending slots 182. A pair of fasteners 184 extend through apertures in upstanding portion 172 and through slots 182. Palm rest lock knobs 186 are threaded on fasteners 184. Lock knobs 186 and fasteners 184 allow vertical adjustment of the pad subassembly. A padded member 188 can be optionally secured to elongated support member 176 along flange 178. Member 188 defines a soft surface which will support the users wrists or palms. As seen in FIGS. 9 and 10, member 176 defines a central handle portion 194. A retainer 196 is press-fitted over upstanding portion 172 along the central region behind the handle 176

The platform subassembly may be grasped at handles 164, 194 and rotated about end pivots or fasteners 138 to the desired tilt angle. The frictional retention force is adjusted through nuts 144 and selection of the Belleville springs 142.

Attachment means 16 permits the keyboard support tray portion or platform to be moved inwardly and outwardly with respect to the work support 20 between stored positions and various operating positions. Attachment mean 16 includes a generally channel shaped track 210. Track 210 is secured to an underside 211 of work support 20. An elongated beam 220 hingedly receives swivel 30. A vertical axis hinge bolt 222 extends through a forward portion of beam 220 and swivel plate 30. Bolt 222 is secured by a nut 224. The vertical axis hinge means including the bolt 220 is enclosed by a beam cover 226. Transverse tube 24, therefore, is mounted on beam 220 for hinging or pivoting movement about a forward vertical axis.

A rear end of beam 220 is secured to a slide 230 by a second vertical axis hinge means including a fastener 232. Fastener 232 extends through beam 220, a spacer 234 and slide 230. Fastener 232 is threaded to a nut 236. As a result, the rear of beam 220 pivots about a vertical axis. As shown in FIG. 4, slide 230 carries slide bushings 238, 240 along its lateral edges. The bushings ride within the track 210. A cover 244 (FIG. 2) closes the front of the track after the slide is installed.

OPERATION

In use, track 210 is secured to the undersurface of a work support 20. Slide 230 is positioned within the track and cover 244 is applied. Support member 24 is hinged to the forward portion of the beam. To store the keyboard support apparatus, beam 220 is moved rearwardly along the elongated track 210. Beam 220 may then be pivoted about the vertical axis defined by fastener 232 and the vertical axis defined by fastener 222 until platform subassembly 14 is stored under the work support 20. After the assembly is moved to an operating position, the user loosens cap 90 and positions arms 38, 40. Knob 159 is loosened and members 152, 154 are positioned. Arms 38, 40 may be rotated through an angle. A keyboard is placed on the members and knob 159 is tightened. Next, the tilt angle of the platform subassembly is adjusted.

As seen in FIG. 2, the keyboard support assembly has a very low profile. The keyboard support significantly increases knee clearance when compared to existing devices. Interference with the user when stored is reduced if not eliminated. The beam and dual vertical hinge arrangement permit movement of the platform subassembly 14 to a wide variety of positions. The beam may, for example, be pulled outwardly and swivel 30 rotated about axis 222 to move the keyboard support platform to the side or at an angle with respect to the work support. The user may readily adjust the platform to hold different size keyboards. The platform is readily tilted to achieve the desired angle. Arms 38, 40 are easily positioned at a desired height. Springs 102, 104 counterbalance the weight of the keyboard on platform subassembly 14 which eases the operation of the support subassembly. Knee pad 150 protects the users knees when the platform is in a fully or partially stored position. A wide variety of ergonomically desirable positions are achievable with the articulated keyboard support in accordance with the present invention.

Problems heretofore experienced with knee or other interference are eliminated. The apparatus is of reduced complexity when compared to supports heretofore available. The apparatus in accordance with the present invention is relatively easily manufactured at reduced cost and with reduced difficulties of assembly.

In view of the foregoing description, those of ordinary skill in the art may envision various modifications which would not depart from the inventive concepts disclosed herein. It is expressly intended, therefore, that the above description should be considered as only that of the preferred embodiment. The true spirit and scope of the present invention may be determined by reference to the appended claims.

The embodiments of the invention in which an exclusive property or privilege is claimed are defined as follows:

1. An adjustable keyboard support for supporting and adjustably positioning a computer keyboard, said support comprising:
   an elongated support member having ends;
   first and second arms having upper ends and lower ends;
   mounting means engaging said arms for pivotally mounting said upper ends of said arms to ends of said elongated support member for movement about a first horizontal axis;
   keyboard platform means operatively connected to the lower ends of said arms for receiving a keyboard, said mounting means including counterbalancing means disposed within said elongated support member and operatively connected to said arms for counterbalancing the weight of a keyboard positioned on said keyboard platform means, said counterbalancing means resiliently biasing said arms for pivotal movement about said first horizontal axis from a lowered position to a raised position; and
   keyboard pivot means for pivotally connecting said keyboard platform means to said lower ends of said arms for adjustable and lockable pivotal movement about a second horizontal axis.

2. An adjustable keyboard support device for supporting and adjustably positioning a computer keyboard with respect to a worksurface defined by a work support, said device comprising:
   an elongated support member having ends;
   first and second arms having upper ends and lower ends;
   mounting means engaging said arms for pivotally mounting said upper ends of said arms to ends of said elongated support member for movement about a first horizontal axis;
   keyboard platform means operatively connected to the lower ends of said arms for receiving a keyboard;
   keyboard pivot means for pivotally connecting said keyboard platform means to said lower ends of said arms for adjustable and lockable pivotal movement about a second horizontal axis extending parallel to said first horizontal axis;
   attachment means operatively connected to said elongated support member for attaching the elongated support member to a work support; and
   counterbalancing means disposed within said elongated support member and operatively connected to said arms for counterbalancing the weight of a keyboard positioned on said keyboard platform means, said counterbalancing means resiliently biasing said arms for pivotal movement about said first horizontal axis from a lowered position to a raised position.

3. An adjustable keyboard support device as defined by claim 2 wherein said mounting means comprises:
   an elongated axle; and
   first and second generally cylindrical members rotatably disposed within ends of said support member, said axle extending through said cylindrical members to support the axle for rotation within said support member.

4. An adjustable keyboard support device as defined by claim 3 wherein said arm upper ends each define a socket which receives one of said cylindrical members, each of said sockets and said cylindrical members including interlocking teeth.

5. An adjustable keyboard support device as defined by claim 4 wherein said mounting means further includes a pair of counterbalancing springs, each spring including an end engaging said support member and an end engaging one of said cylindrical members.

6. An adjustable keyboard support device as defined by claim 2 wherein said attachment means comprises:
   a beam; and
   vertical hinge means between the beam and said support member for mounting said support member to said beam for pivotal movement about a vertical axis.

7. An adjustable keyboard support device as defined by claim 6 wherein said attachment means further includes:
   a track;
   a slide disposed within said track; and
   another vertical hinge means between the slide and beam for connecting said beam to said slide for pivotal movement about another vertical axis.

8. An adjustable keyboard support device as defined by claim 2 wherein said keyboard platform means comprises:
   an elongated bridge member having ends engaged by said pivot means; and front and back platform members mounted on said bridge.

9. An adjustable keyboard support device for supporting and adjustably positioning a computer keyboard with respect to a worksurface defined by a work support, said device comprising:
an elongated support member having ends;
first and second arms having upper ends and lower ends;
mounting means engaging said arms for pivotally mounting said upper ends of said arms to ends of said elongated support member;
keyboard platform means operatively connected to the lower ends of said arms for receiving a keyboard;
keyboard pivot means for pivotally connecting said keyboard platform means to said lower ends of said arms for adjustable and lockable pivotal movement about a horizontal axis;
attachment means operatively connected to said elongated support member for attaching the elongated support member to a work support, said keyboard platform means comprising an elongated bridge member having ends engaged by said pivot means, and front and back platform members mounted on said bridge; and
palm rest means removably mounted on said keyboard platform means for providing a palm rest surface.

10. An adjustable keyboard support device as defined by claim 8 wherein said attachment means comprises:
a beam; and
vertical hinge means between the beam and said support member for mounting said support member to said beam for pivotal movement about a vertical axis.

11. An adjustable keyboard support device for supporting and adjustably positioning a computer keyboard with respect to a worksurface defined by a work support, said device comprising:
an elongated support member having ends;
first and second arms having upper ends and lower ends;
mounting means engaging said arms for pivotally mounting said upper ends of said arms to ends of said elongated support member;
keyboard platform means operatively connected to the lower ends of said arms for receiving a keyboard;
keyboard pivot means for pivotally connecting said keyboard platform means to said lower ends of said arms for adjustable and lockable pivotal movement about a horizontal axis;
attachment means operatively connected to said elongated support member for attaching the elongated support member to a work support, said keyboard platform means comprising an elongated bridge member having ends engaged by said pivot means, and front and back platform members mounted on said bridge, said attachment means comprising:
a beam;
first vertical hinge means between the beam and said support member for mounting said support member to said beam for pivotal movement about a first vertical axis;
a track;
a slide disposed within said track; and
second vertical hinge means between the slide and beam for connecting said beam to said slide for pivotal movement about a second vertical axis.

12. An adjustable keyboard support device as defined by claim 11 wherein said mounting means comprises:
an elongated axle; and
first and second generally cylindrical members rotatably disposed within ends of said support member, said axle extending through said cylindrical members to support the axle for rotation within said support member.

13. An adjustable keyboard support device as defined by claim 12 wherein said arm upper ends each define a socket which receives one of said cylindrical members, each of said sockets and said cylindrical members including interlocking teeth.

14. An adjustable keyboard support device as defined by claim 13 wherein said mounting means further includes a pair of counterbalancing springs, each spring including an end engaging said support member and an end engaging one of said cylindrical members.

15. An articulated keyboard support apparatus positionable under a worksurface, said apparatus comprising:
an elongated beam subassembly;
a swivel pivoted to said beam subassembly at one end thereof for movement about a vertical axis;
an elongated housing carried by said swivel;
an arm subassembly including an arm pivoted to said housing at one end for movement about a horizontal axis, said subassembly including counterbalance means for resiliently biasing said arm towards a raised position and lock means for locking said arm in a desired operating position; and
a keyboard platform subassembly having ends pivoted to said arm subassembly for movement about another horizontal axis, said keyboard platform subassembly defining a surface for support of a computer keyboard.

16. An apparatus as defined by claim 15 wherein said arm subassembly includes a pair of arms extending generally perpendicular to said elongated housing, each of said arms defining a lower hub portion, said keyboard platform subassembly further including friction means for adjustably pivoting said platform subassembly to said lower hub portions of said arms.

17. An apparatus as defined by claim 16 wherein said arm subassembly further comprises:
an elongated axle extending within said housing, each of said arms being positioned on an end of said axle.

18. An apparatus as defined by claim 17 wherein said arm subassembly further comprises:
a pair of clutch members, each clutch member being non-rotatably disposed on an end of said axle.

19. An apparatus as defined by claim 18 wherein each of said arms includes an upper hub portion which defines means for selectively positioning said arms on one of said clutch members, each of said clutch members being rotatable within an end of said housing.

20. An apparatus as defined by claim 19 wherein said counterbalance means comprises a spring encircling said axle and having an end fixed to said housing and an end fixed to one of said inner clutch members.

21. An apparatus as defined by claim 15 wherein said beam subassembly further comprises:
a track adapted to be attached to a work support;
a slide supported on said track for sliding movement;

an elongated beam member having a rear end and a forward end portion, said swivel being pivoted to the forward end portion of said beam; and vertical hinge means engaging said beam member for pivoting said beam member adjacent said rear end to said slide for movement about a vertical axis.

22. An apparatus as defined by claim 21 wherein said beam subassembly further includes a slide bearing positioned on said slide and engaging said track.

23. An apparatus as defined by claim 20 wherein said beam subassembly further comprises:

a track adapted to be attached to a work support;

a slide supported on said track for sliding movement;

an elongated beam member having a rear end and a forward end portion, said swivel being pivoted to the forward end portion of said beam; and vertical hinge means engaging said beam member for pivoting said beam member adjacent said rear end to said slide for movement about a vertical axis.

24. An apparatus as defined by claim 23 wherein said beam subassembly further includes a slide bearing positioned on said slide and engaging said track.

25. An apparatus as defined by claim 16 wherein said platform subassembly comprises:

an elongated bridge member having ends pivoted to said arms;

a front platform member on said bridge;

a rear platform member on said bridge, said platform members being slideably adjustable with respect to each other; and lock means engaging said bridge for locking said platform members in position with respect to each other.

26. An apparatus as defined by claim 25 wherein said platform subassembly further includes a handle on said rear platform.

27. An apparatus as defined by claim 15 further including a palm rest subassembly removably joined to said platform subassembly.

28. An apparatus as defined by claim 27 wherein said palm rest subassembly comprises:

an elongated support member having a generally L-shape in vertical cross section and thereby defining a generally horizontal surface and a vertical portion; and a pad on said horizontal surface.

29. An apparatus as defined by claim 28 wherein said platform subassembly comprises:

an elongated bridge member having ends pivoted to said arms;

a front platform member on said bridge;

a rear platform member on said bridge, said platform members being slideably adjustable with respect to each other; and lock means engaging said bridge for locking said platform members in position with respect to each other.

30. An apparatus as defined by claim 29 wherein said vertical portion of said palm rest support member is removably joined to said front platform at a forward edge thereof and wherein said palm rest subassembly further includes vertical adjustment means engaging said palm rest support member for allowing vertical positioning of said pad with respect to said platform subassembly.

31. An apparatus as defined by claim 30 wherein said platform subassembly further includes a handle on said rear platform.

32. An apparatus as defined by claim 27 wherein said arm subassembly includes a pair of arms extending generally perpendicular to said elongated housing, each of said arms defining a lower hub portion, said keyboard platform subassembly being pivoted to said lower hub portions of said arms.

33. An apparatus as defined by claim 32 wherein arm subassembly further comprises:

an elongated axle extending within said housing, each of said arms being positioned on an end of said axle.

34. An apparatus as defined by claim 33 wherein said arm subassembly further comprises:

a pair of pivot members, each pivot member being non-rotatably disposed on an end of said axle.

35. An apparatus as defined by claim 34 wherein each of said arms includes an upper hub portion which defines means for selectively positioning said arms on one of said pivot members, each of said pivot members being rotatable within an end of said housing.

36. An apparatus as defined by claim 35 wherein said counterbalance means comprises a pair of springs, each of said springs encircling said axle and having an end fixed to said housing and an end fixed to one of said pivot members.

37. An apparatus as defined by claim 36 wherein said beam subassembly further comprises:

a track adapted to be attached to a work support;

a slide supported on said track for sliding movement;

an elongated beam member having a rear end and a forward end portion, said swivel being pivoted to the forward end portion of said beam; and vertical hinge means engaging said beam member for pivoting said rear end of said beam member to said slide for movement about a vertical axis.

38. An apparatus as defined by claim 37 wherein said beam subassembly further includes a slide bearing positioned on said slide and engaging said track.

39. An adjustable keyboard support for supporting and adjustably positioning a computer keyboard, said support comprising:

an elongated support member having ends;

first and second arms having upper ends and lower ends;

mounting means engaging said arms for pivotally mounting said upper ends of said arms to ends of said elongated support member;

keyboard platform means operatively connected to the lower ends of said arms for receiving a keyboard, said mounting means including counterbalancing means operatively connected to said arms for counterbalancing the weight of a keyboard positioned on said keyboard platform means, said counterbalancing means resiliently biasing said arms from a lowered position to a raised position; and keyboard pivot means for pivotally connecting said keyboard platform means to said lower ends of said arms for adjustable and lockable pivotal movement about a horizontal axis, and wherein said mounting means comprises:

an elongated axle; and first and second generally cylindrical members rotatably disposed within ends of said support member, said axle extending through said cylindrical members to support the axle for rotation within said support member.

40. An adjustable keyboard support as defined by claim 39 wherein said arm upper ends each define a socket which receives one of said cylindrical members, each of said sockets and said cylindrical members including interlocking teeth.

41. An adjustable keyboard support device as defined by claim 40 wherein said counterbalancing means comprises:

a pair of counterbalancing springs, each spring including an end engaging said support member and an end engaging one of said cylindrical members.

42. An adjustable keyboard support as defined by claim 41 wherein said keyboard platform means comprises:

an elongated bridge member having ends engaged by said pivot means; and front and back platform members mounted on said bridge member.

43. An adjustable keyboard support as defined by claim 42 further including:

palm rest means removably mounted on said keyboard platform means for providing a palm rest surface.

* * * * *